Jan. 11, 1966  C. J. ROGERS, SR  3,229,163
ELECTRICAL SAFETY CIRCUIT
Filed March 11, 1963
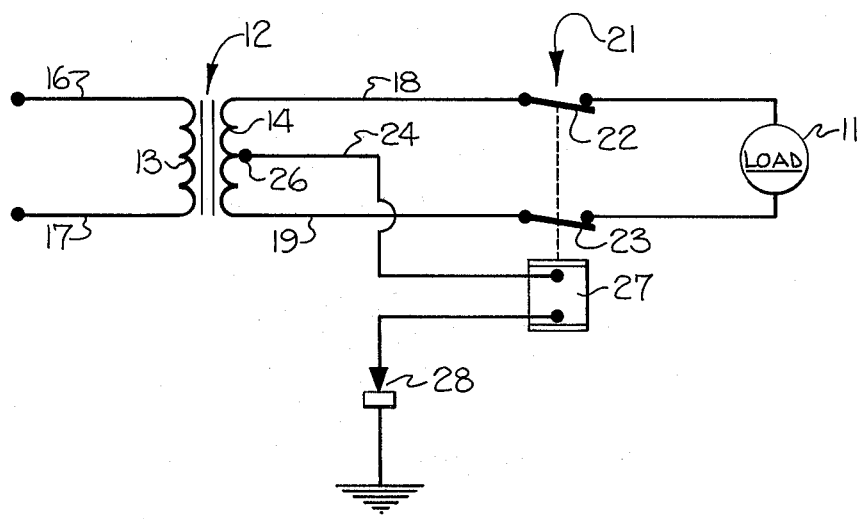
INVENTOR.
CHARLES J. ROGERS, SR.
BY
Russell Foster United States Patent Office 3,229,163
Patented Jan. 11, 1966

3,229,163
ELECTRICAL SAFETY CIRCUIT
Charles J. Rogers, Sr., 1312 Coosaw Drive,
Charleston, S.C.
Filed Mar. 11, 1963, Ser. No. 264,301
5 Claims. (Cl. 317—18)

This invention relates to an electrical safety circuit and more particularly to a circuit for preventing personal injury and property damage in an electrical distribution system.

In electrical power distribution systems, particularly a distribution system of the type found in residential construction which provides a "hot" conductor and an associated ground wire for supplying power to a load, many hazards arise upon the presence of a defect in or inadvertent contact by a person with the hot or live conductor. For instance, the contact by a person with a live conductor in such a system can frequently produce a severe electrical shock and on occasion a fatality due to the circuit completed through the human body and the ground conductor in the system. Another type of fault common to such a system is a direct short to ground from the live conductor for which protection is generally provided in the form of overload devices and/or a low resistance ground to localize the fault. However, overload devices generally do not operate except upon a high current flow common to an overload so that current leakage can occur resulting in a fire hazard and waste of current. Furthermore, low resistance protective grounds are often improperly connected and many times are not used so that such fault protections does not provide the desired degree of protection sought.

It has been proposed to couple such an electrical distribution system to the power source by means of an isolation transformer or the like with the attendant elimination of the conventional ground wire so as to isolate the load conductor from the ground. Such a circuit also includes a special grounded circuit connected to a circuit breaker arranged to interrupt the load conductors upon the presence of a low resistance ground fault in a load conductor or the contact by a person with a load conductor so that the body completes the circuit to ground. While such a protective circuit is generally effective for a low resistance ground fault, the completion of a circuit through the human body for actuating the circuit breaker is latent with hazards even though attempts are made to disconnect the load from the source of power by means of the circuit breaker before injury to the body can occur. For instance, the magnitude of the voltage to which the protective circuit responds when a circuit is completed through the human body is generally higher than the maximum voltage permitted for avoidance of injury. Furthermore, as such circuits generally require the use of very sensitive components, the likelihood of component failure or improper response is always present however remote so that there is always the possibility of an injurious if not a fatal shock to a person whose body forms part of a circuit through which actuation of the protective circuit occurs. As can be understood, not only is such an electrical shock hazardous to a healthy person but if sustained by a person whose body is in a weakened condition resulting from such defects as overall poor health, a bad heart or the like, the likelihood of injury or possibly death is greatly increased.

Accordingly, a primary object of this invention is to provide a new and novel safety circuit for an electrical distribution system of the type commonly found in residences, shops, buildings and the like which prevents property damage from load line low resistance ground faults and body injury or fatality from contact by a person with a load line.

Another object of the invention is to provide a new and novel safety circuit for an electrical distribution system which isolates the load lines from ground and which acts to disconnect the load lines from the power source immediately upon the occurrence of a low resistance ground fault in a load line.

A further object of the invention is to provide a new and novel safety circuit for an electrical distribution system which is nonresponsive to the grounding of a load conductor through the human body resulting from contact with the conductor by a person so as to eliminate body injury or death but which responds quickly to protect the system against damage from low resistance ground faults on the load conductor.

This invention further contemplates the provision of a new and novel safety circuit for an electrical distribution system which is simple and inexpensive in construction, which utilizes reliable and rugged circuit components, which eliminates the need for the protective grounding of electrically operated load devices which are connected to the system and which lends itself to a portable form for shop and household use with commonly provided electrical wall receptacles.

Other objects and advantages of the invention will become apparent from the following description taken in connection with the accompanying drawing.

In general, the objects of the invention and related objects are accomplished by the provision of a transformer having a primary winding and a secondary winding with the primary winding connected to a source of electrical power. The secondary winding of the transformer is connected to a pair of hot conductors for connection to a load and normally closed switching means are connected between the transformer secondary winding and the load for interrupting the load conductors to disconnect the load. Circuit means are connected between the transformer secondary winding and ground which is operatively associated with the switching means for actuating the switching means upon the occurrence of low resistance ground fault in one of the load conductors to interrupt the conductors and disconnect the load. The circuit means is nonresponsive to the grounding of a load conductor by contact with the human body so as to prevent actuation of the switching means.

The novel features which are believed to be characteristic of the invention are set forth with particularity in the appended claims. The invention itself, however, both as to its organization and method of operation may be best understood by reference to the following description taken in conjunction with the accompanying drawing in which:

The drawing is a schematic wiring diagram illustrating the electrical safety circuit of the invention.

Referring now to the drawing, there is shown a safety circuit constructed in accordance with the invention for protection of an electrical distribution system against ground fault and to prevent injuries to persons coming into contact with the "hot" wires in the system. The electrical safety circuit of the invention is arranged to supply a load such as lighting, appliances or a motor 11 with power from a suitable source of power (not shown).

In order to connect the load or motor 11 to the source of power, an isolation transformer designated generally by the numeral 12 is utilized which contains a primary winding 13 and a secondary winding 14. The primary winding 13 of the transformer 12 is connected at its ends by means of conductors 16, 17 to the source of power. The transformer 12 is of the type which provides a 1:1 voltage transforming ratio so as to provide the same voltage in the transformer secondary winding 14 as the voltage across the transformer primary winding 13. As the circuit of the invention has its primary use in residences, shops, buildings, etc., where the voltage source is approximately 120 volts, the voltage across both transformer windings 13, 14 is approximately 120 volts. Furthermore, by the use of the isolation transformer 12, the conventional ground wire commonly employed with the secondary winding 14 is eliminated and the secondary winding 14 is isolated from ground.

The ends of the transformer secondary winding 14 are connected by means of "hot" or live conductors 18, 19 to the load such as the motor 11 through normally closed switching means designated generally by the numeral 21. Switching means 21 includes a pair of gang operated switches 22, 23 which are normally urged into the closed position as shown in the drawing to connect the transformer secondary winding 14 to the load 11.

Circuit means are provided in the circuit of the invention for actuating the switching means 21 and moving the switches 22, 23 to the open position to thereby interrupt load conductors 18, 19 and disconnect the load 11 from the transformer secondary winding 14 upon the presence of a low resistance ground fault in one of the conductors 18, 19. More specifically, conductor 24 is provided which is connected at one end to the transformer secondary winding 14 preferably at a center tap 26 and at its other end to ground.

A relay coil 27 operatively associated with the switching means 21 is connected at each end serially with the conductor 24 and means such as a half wave rectifier 28 is connected to the conductor 24 serially with the coil 27 for providing a voltage having a magnitude of approximately one-half of the voltage obtained at the transformer secondary winding center tap 26. Thus, if the voltage applied to the primary winding 13 of the transformer 12 across conductors 16, 17 is approximately 120 volts A.C., the voltage obtained at the transformer secondary winding center tap 26 is approximately 60 volts being one half of the voltage across the secondary winding 14 which corresponds to the primary winding voltage. With the use of the half wave rectifier 28, the voltage impressed on the coil 27, now D.C. as a result of rectification, is approximately one half of the transformer secondary winding center tap voltage of 60 volts or a voltage of approximately 27 volts D.C.

In the operation of the circuit of the invention, the primary winding 13 of the transformer 12 is connected to a source of power and the load or motor 11 is connected as shown in the drawing to the transformer secondary winding 14. The switches 22, 23 are in the closed position so that power is supplied to the motor 11. Upon the occurrence of a low resistance ground in one of the load conductors 18, 19 such as would occur upon the contact of a bare portion of one of the load conductors with ground or a short in the windings of the motor load 11, assuming the frame is in contact with the ground, a circuit is immediately established through conductor 24 and ground. A large current flow occurs in relay coil 27 notwithstanding the low voltage through the grounded circuit of conductor 24. The switching means 21 is therefore actuated to move the switches 22, 23 to the open position interrupting the conductors 18, 19 and disconnecting the load 11 from the source of power. Thus, damage to the system or property resulting from such a low resistance ground fault is avoided. It should be understood that if desired switching means 21 may be provided with means for latching the relay in the open position so that resetting is necessary before the switching means will close or a holding circuit may be provided for holding the switching means 21 in the open position.

If one of the live conductors 18, 19 is contacted by the body of a person or if a person touches the frame of the motor 11 which is ungrounded but wherein the motor winding has become shorted to the frame, there is very little if any flow of current through the person's body due to the high body resistance and the low voltage in the circuit of conductor 24. Thus relay coil 27 does not actuate the switching means 21 and the switches 22, 23 remain in the closed position. In this way injury or death from electrical shock to a person contacting the load conductors in the system cannot occur.

It can be seen that there has been provided with the novel electrical safety circuit of the invention a protective arrangement for an electrical distribution system of the type commonly found in both residential areas and in industrial areas wherein ground faults on live conductors can produce disastrous losses and wherein contact of such conductors by a person can cause injury or death. Not only is the ground wire common to such distribution systems in use today eliminated but it has been replaced with a novel circuit which although responding with great rapidity to a low resistance ground fault in the load conductors of the system to disconnect the load, it will maintain the distribution system in operating condition when the load conductors are grounded by the human body such as when inadvertently contacted by a person. The prior art arrangement using the grounded human body to actuate a safety circuit with its attendant latent dangers has been eliminated as the circuit of the invention is completely unresponsive to such grounding by the human body. Furthermore, the circuit of the invention not only utilizes a minimum of components so as to reduce its cost but the components may be conveniently packaged so as to provide a highly portable protective circuit which may be used in conjunction with presently employed electrical power outlets with complete safety.

Although the isolation transformer in the circuit of the invention has a 1:1 ratio so as to permit the circuit to be associated with the conventional 120 volt power source, it is within the scope of the invention to provide such a transformer having other ratios to permit the circuit to be used in conjunction with other source voltages such as 220 volts and the like. It should also be understood that although complete protection for a person is provided with the circuit of the invention without the use of a conventional ground wire for grounding the frame or housing of a load such as a tool, appliance or the like, such a wire may still be used if desired whereby a short in the tool or the like will immediately produce a current flow through the low resistance ground so as to bring about interruption of the load conductors and disconnection of the load.

While there has been described what at present is considered to be the preferred embodiment of the invention, it will be understood by those skilled in the art that various changes and modifications may be made therein without departing from the invention and, therefore, it is the aim of the appended claims to cover all such changes and modifications as fall within the true spirit and scope of the invention.

Having thus described the invention, what is claimed is:

1. An electrical safety circuit comprising, in combination, a transformer having a primary winding connected to a source of electrical power and a secondary winding connected by means of live conductors to a load, normally closed switching means for interrupting said live conductors and disconnecting said load from said transformer secondary winding and circuit means connected between said transformer secondary winding and ground for actuating said switching means upon the occurrence of a low resistance ground fault in one of said live conductors to interrupt said live conductors and disconnect said load, said circuit means being non-responsive to a fault produced by the grounding of one of said live conductors by the human body to prevent actuation of said switching means.

2. An electrical safety circuit comprising, in combination, a transformer having a primary winding connected to a source of electrical power and a secondary winding connected by means of live conductors to a load, normally closed switching means for interrupting said live conductors and disconnecting said load from said transfomer secondary winding and circuit means connected between said transformer secondary winding and ground for actuating said switching means upon the occurrence of a low resistance ground fault in one of said live conductors to interrupt said live conductors and disconnect said load, said circuit means having a voltage level of between 20 to 30 volts when the voltage across said live conductors is approximately 120 volts whereby said circuit means is nonresponsive to a fault produced by the grounding of one of said live conductors by the human body to thereby prevent actuation of said switching means.

3. An electrical safety circuit comprising, a combination, a transformer having a primary winding connected to a source of electrical power and a secondary winding connected by means of a live conductors to a load, normally closed switching means for interrupting said live conductors and disconnecting said load from said transformer secondary winding, circuit means including a coil operatively associated with said switching means connected between the center tap of said transformer secondary winding and ground for actuating said switching means upon the occurrence of a low resistance ground fault in one of said live conductors to interrupt said live conductors and disconnect said load, means for reducing the voltage in said circuit means to approximately one-half of the voltage at the center tap of said transformer secondary winding to provide a voltage level in said circuit means of between 20 to 30 volts whereby said circuit means is nonresponsive to a fault produced by the grounding of one of said live conductors by the human body to thereby prevent actuation of said switching means.

4. An electrical safety circuit in accordance with claim 3 wherein said voltage reducing means comprises a half wave rectifier in said circuit means.

5. An electrical safety circuit comprising, in combination, a transformer having a primary winding connected to a source of electrical power and a secondary winding connected by means of a pair of live conductors to a load, a normally closed switch connected in each of said live conductors for simultaneously interrupting both of said live conductors and disconnecting said load from said transformer secondary winding, a coil operatively associated with said switches connected between the center tap of said transformer secondary winding and ground, a half-wave rectifier serially connected with said coil, said coil having applied voltage of approximately 27 volts when the voltage between said live conductors is approximately 120 volts, said coil being arranged to actuate said switches upon the occurrence of a low resistance ground fault in one of said live conductors to interrupt said live conductors and disconnect said load and said coil being nonresponsive to a fault produced by the grounding of one of said live conductors by the human body to thereby prevent actuation of said switches.

References Cited by the Examiner

UNITED STATES PATENTS

| 2,079,636 | 5/1937 | Sharp | 318—18 |
| 2,844,765 | 7/1958 | Sosnoski | 317—18 |

SAMUEL BERNSTEIN, *Primary Examiner.*